United States Patent [19]
Xu et al.

[11] Patent Number: 5,630,857
[45] Date of Patent: May 20, 1997

[54] PROCESS FOR MANUFACTURING GRIN LENSES BY MELTING A SERIES OF LAYERS OF FRITS

[75] Inventors: Xiaojie Xu; Michael E. Savard, both of Tucson, Ariz.

[73] Assignee: Lightpath Technologies, Inc., Albuquerque, N.M.

[21] Appl. No.: 441,275

[22] Filed: May 15, 1995

Related U.S. Application Data

[63] Continuation of Ser. No. 163,861, Dec. 8, 1993, abandoned.
[51] Int. Cl.⁶ ........................................ C03B 19/06
[52] U.S. Cl. .................. 65/173; 65/17.6; 65/37; 65/45
[58] Field of Search .................. 65/37, 42, 17.3, 65/21.2, 45, 99.1, 17.6, 144

[56] References Cited

U.S. PATENT DOCUMENTS

| | | | |
|---|---|---|---|
| 2,137,931 | 11/1938 | Craven | 65/141 |
| 2,596,799 | 5/1952 | Tillyer | 65/39 |
| 4,883,522 | 11/1989 | Hagerty. | |
| 4,929,065 | 5/1990 | Hagerty. | |
| 4,956,000 | 9/1990 | Reeber | 65/18.1 |
| 5,200,858 | 4/1993 | Hagerty. | |
| 5,236,486 | 8/1993 | Blankenbecler | 65/37 |
| 5,262,896 | 11/1993 | Blankenbecler | 65/18.1 |

*Primary Examiner*—John Hoffmann
*Attorney, Agent, or Firm*—Benman Collins & Sawyer

[57] ABSTRACT

A method of manufacturing an optical device having a profile of refractive indices along its optical axis. A desired volume of each of a plurality of types of optical material are dispensed into a mold of known plan area in the form of a frit or a melt and the mold is heated to cause the materials to melt and fuse together to define a contiguous body of optical material having a desired profile. As the optical materials melt, the different types of material separate out so that they are arranged with the most dense material closest to the bottom of the mold and the least dense material closest to the top of the mold. To enhance this effect, the optical materials are layered in the mold in decreasing order of density of the materials from the bottom to the top so that the layers of optical material with the greater densities are closer to the bottom of the mold than the layers of materials with lesser densities.

6 Claims, 3 Drawing Sheets

PROCESS FOR MANUFACTURING GRIN LENSES BY MELTING A SERIES OF LAYERS OF FRITS

This is a continuation of application Ser. No. 08/163,861, filed on Dec. 8, 1993, Abandoned.

TECHNICAL FIELD

This invention relates to methods for making an optical device having a gradient of refractive index across its thickness which is useful in a process of manufacturing an optical lens having a predetermined gradient of refractive index along its optical axis.

BACKGROUND

Lenses which have a gradient of refractive indices (GRIN lenses) have been known for some time. These lenses have numerous uses in the optics, optical fiber and solar technology industries and are useful in designing compound lens systems using a single, integral lens or a reduced number of lenses. A GRIN lens can exhibit a change of refractive index along its optical axis or bi-directionally (both orthogonally radial to and along the optical axis). More complex GRIN lenses, which have changes in refractive index in three dimensions, are also known.

An example of a lens which has a chosen gradient in its index of refraction both orthogonal to and longitudinally along an optical axis is illustrated in U.S. Pat. No. 4,883,522 to Hagerty. Other examples of GRIN lenses can also be found in U.S. Pat. No. 4,929,065 to Hagerty and in the documents referred to therein. In particular, the '065 Hagerty patent, the disclosure of which is incorporated herein by reference, discloses a method of manufacturing a GRIN lens which has a large change in index of refraction over a significant dimension along only its optical axis. The method disclosed in this patent requires that a number of glass wafers each having a different refractive index, be stacked on top of one another. The stack is then heated to above the fusion temperature of the individual wafers which fuse together to define a contiguous unit of optical material. The fused stack can then be ground to form the defined GRIN lens.

This method, when used correctly, can produce a good quality GRIN lens with an accurately defined gradient in refractive index. The method does, however, have the disadvantage that it is a very expensive and time consuming to prepare the individual wafers required. This is partly because the wafers must be accurately ground to the desired thickness and must have very smooth surfaces to reduce the amount of air bubbles which would otherwise be trapped between the wafers as they are stacked to form a block. The required cutting, grinding and polishing can, in extreme cases, result in the loss of as much as 30% to 50% of the glass.

In an alternative prior method of manufacturing GRIN lenses, two glasses are selected, the indices of which represent the end members of the gradient profile desired. Each is ground to a powder and then mixed together in suitable proportions calculated to create a series of mixtures, each of which when fused has the index required for the gradient profile. Each mixture is then carefully and successively layered into a platinum alloy mold. The mold with glass powder is placed into a furnace and slowly heated to fusion temperature, then held at a predetermined temperature for diffusion and slowly cooled.

This method has the disadvantage in that the two glass types in the powder usually have different densities, with the higher density glass having a lower melting temperature. As the glass particles start to melt, the higher density glass melts first and tends to sink to the bottom of the mold and the less dense glass particles tend to move up toward the surface of the molten denser glass before they melt. As a result, separation of glass types within layers occur and mixing between layers occurs. In extreme cases the denser and less dense glasses separate into substantially two different layers, resulting in a body made up of essentially two layers having different refractive indices, as opposed to the continuous gradient in refractive index required. Because of this effect, it is very difficult to accurately control the gradient of refractive index using this process.

Furthermore, it is very difficult to remove small bubbles of air that are trapped in the powder as it melts. This means that the final piece of optical material could have unacceptably large defects as a result of trapped air.

Accordingly, a need has arisen for a process of manufacturing a GRIN lens, which has a gradient of refractive indices along its optical axis, which does not have the above disadvantages. This process should be able to produce a GRIN lens with a similar refractive index profile to the "wafer process" in the Hagerty patent above, produce a lens of high optical quality, and must be reproducible.

SUMMARY OF THE INVENTION

Briefly therefore, this invention provides a method for manufacturing an optical device from a plurality of layers of different optical materials such as different glasses, each of which materials having a different refractive index from the others, and in which the densities of the material varies with increasing refractive index. According to the invention, the layers are formed by successively dispensing in order of decreasing density a measured amount of each optical material into a mold. The materials are preferably dispensed in the form of a frit. Alternatively, they can be dispensed in molten form. The dispensing of the material results in a series of layers of such optical materials, each layer having a substantially uniform composition, in which the density of the materials of layers decreases from the bottom towards the top of the mold. By "uniform composition" is meant that, in the case of a frit, all the frit particles forming a layer have the same composition. The optical materials in the mold are then heated to fuse them together to define a contiguous body of optical material.

The invention may be applied for the manufacture of an optical element having a desired profile of refractive index along its optical axis. In this case, the thickness of each layer of optical material is determined, for instance, by the technique described in the U.S. Pat. No. 4,929,065 in order that the fused optical element have the desired characteristic. Typically, the optical materials are glasses having different refractive indices.

The products of the method of the present invention are also suitable for other uses such as optical limitors, optical intensity detectors, and optical switches. Because of the gradient of the mechanical properties of the products of the invention, sound will travel at different speeds at different locations within the products. Thus it is possible to make use of the invention in tunable electronic signal delayed devices and similar products. The products of the invention may also have decorative uses.

When the material is dispensed into a mold of known plan area, the required weight of optical material of a given type needed to yield a layer of a given thickness may be calculated based on the volume of the layer (based on the plan area and the thickness of the layer) and the density of the optical material. This has the important advantage of allowing much more precise control over the thickness of each layer than prior art methods using stacks of plates of glass. The calculated weight of material can then be weighed out and dispensed into the mold.

Preferably the material is layered into the mold in either solid particulate or molten form. Generally, the particulate form of the material should have particles in a size range of 0.1 to 30 mm, and preferably in the range of 0.1 to 6 mm in diameter. Most preferably, the particles are in the range of 0.5 to 4 mm.

The particulate material can be produced by heating a larger piece of material and, thereafter, rapidly cooling it. This can be done by quenching or by melting the material and pouring it into a bath of cold water. If required, the particulate can also be formed by mechanical crushing.

Other details of the method of the invention will become apparent from the following detailed description of the invention which is illustrated in the several figures of the drawing.

DETAILED DESCRIPTION OF THE INVENTION

The method of this invention is described with reference to FIGS. 1(a) to (c) of the drawings in connection with an embodiment involving the manufacture of an optical element having a substantially linear gradient of refractive index across its thickness.

This embodiment of the process of the invention assumes that the desired profile of refractive indices of a GRIN lens is known. It also assumes that the different glasses and the thickness of each of the different layers of these different glasses which will be used to make up the GRIN lens are known. Typically this information can be determined using the methods used to calculate such parameters in the "wafer process" disclosed in the Hagerty '065 patent above or in U.S. Pat. No. 5,262,896 to Blankenbecker, which is also incorporated herein by reference.

Generally speaking, the glasses selected have different densities associated with their different refractive indices, with the density of the glass within a given family of glasses increasing with increasing index. As described below, the different glass types are fused together by melting to form a GRIN optical material having the desired profile. This fusing takes place in a mold, usually made of an inert material such as platinum, in which the glasses making up the GRIN lens are placed in a furnace.

In terms of this invention and given that the plan area of the diffusion mold to be used can easily be determined, once the thickness of each layer of glass required is known, it is a simple process to calculate the volume of each type of glass that is needed for each layer. Furthermore, as the density of the glass in each layer is known, these calculated volumes can easily be translated into weights of glass required.

Once the weight of the glass required in each layer has been determined and the glass has been cleaned to remove any surface impurities or dirt, accurately weighed batches of each glass type are made up. Preferably, the glass in these batches is in the form of glass chunks or a glass frit which had previously been prepared by methods described below.

Figure 1A:
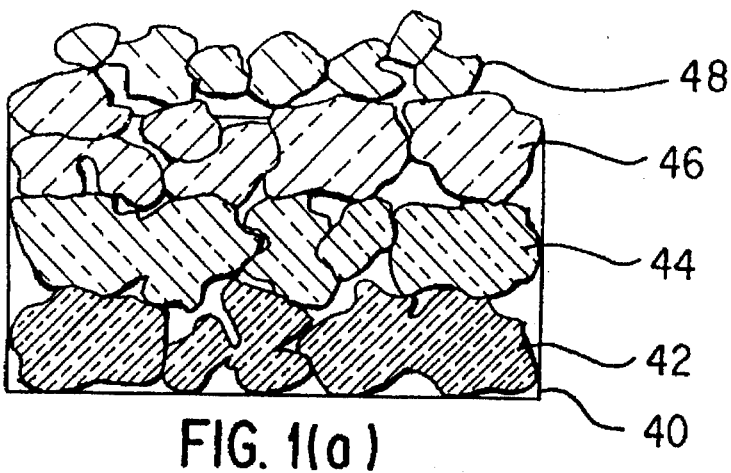
FIGS. 1(a) to 1(c) illustrate one embodiment of the process of the invention.

As shown in FIG. 1(a), the batches of glass frit are then successively layered into a mold 40, preferably made of platinum, with the particles 42 of the batch containing glass of the highest density being layered into the mold 40 first. This is followed by successive layers of particles 44, 46, 48 which are layered into the mold in order of descending glass density towards the top of the mold 40. This means that the glass with the highest density is at the bottom of the mold and that of the lowest density is at the top.

Figure 1B:
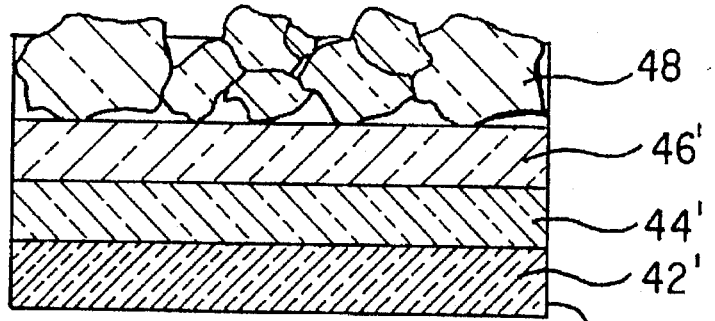

Once this has been done, and as illustrated in FIG. 1(b), the mold is placed in a heated furnace to melt the glass in the different layers. This figure also shows that, if the different glasses have been selected from one "family" of glasses, for instance lead silica glasses, the glass with the lowest melting point is normally that of the highest density and highest index of refraction.

This means that the layers of glass toward the bottom of the mold 40 melt first to form layers of molten glass 42', 44', 46' with the glass particles in the unmolten layer 48 "floating" on top.

Figure 1C:
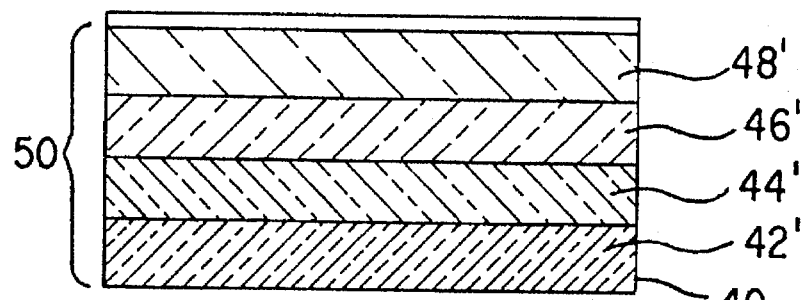

When the temperature is increased above the fusion temperature of the highest melting point glass, as illustrated in FIG. 1(c), the glass layer 48' melts as well so that all the glass is in the molten state and the molten layers are fused with one another, by diffusion across their interfaces, to form one contiguous body of glass 50 which has the desired profile of refractive indices.

As is evident from the above description, the process of the invention relies on the different densities of the glasses to maintain the layers of glass in their appropriate positions in the body of optical material. For best results, it is preferred that the difference in density between adjacent layers be at least 0.1 g/cc. Although the above description indicates that the glass of the highest density should be placed in the bottom of the mold, this is only a preferred way of arranging the glass. The glass could, for instance, be arranged in any convenient manner as the glass will in any event separate out into correctly ordered layers when it melts. In order for this to happen though, the glass may have to be kept at a given melting point or series of melting points for a longer period of time than in the layering method described.

One method of producing a frit of glass particles suitable for weighing is to heat a piece of the selected glass to a temperature of between 400° and 500° C. and then rapidly quench it in distilled water. The resulting thermal shock cracks the glass into small chunks with sizes ranging from about 0.1 mm to 20 mm in diameter. These glass chunks are then dried and may be stored for later weighing. If required, these chunks can be crushed using standard mechanical means.

Another way of preparing the glass chunks is to pour molten glass directly into cold distilled water. This results in a fine glass frit with particle size range of about 0.1 to 10 mm in diameter.

The following examples illustrate the process of the invention in the context of a GRIN lens:

EXAMPLE 1

("Wafer" Process):

In this Example the prior art "wafer process" was used to produce a GRIN optical material which is used as a reference for the GRIN optical materials produced in Examples 2 to 5. For this Example and Examples 2 to 5, seven lead silicate glasses, with properties as listed in the table below, were chosen:

| Glass # | nd | Density (g/cm$^3$) | Thermal Expansion Coefficient ($10^{-7}$ 1° C.) |
|---|---|---|---|
| 1 | 1.563 | 3.02 | 92 |
| 2 | 1.594 | 3.28 | 92 |
| 3 | 1.594 | 3.66 | 90 |
| 4 | 1.672 | 4.05 | 89 |
| 5 | 1.720 | 4.29 | 89 |
| 6 | 1.765 | 4.77 | 91 |
| 7 | 1.807 | 5.12 | 91 |

For each glass type, cylinders 54 mm in diameter were core-drilled out of a 30 mm thick block. These cylinders were then sliced into wafers about 2 mm in thickness using a diamond saw and fine-ground to a specified thickness to a tolerance of ±0.05 mm.

The thicknesses of these glass wafers are:

| Glass 1 | 5.00 mm |
|---|---|
| Glass 2 | 1.65 mm |
| Glass 3 | 1.65 mm |
| Glass 4 | 1.63 mm |
| Glass 5 | 2.10 mm |
| Glass 6 | 1.00 mm |
| Glass 7 | 5.00 mm |

The top and bottom layers were deliberately made thicker than required to compensate for the removal of inhomogeneous or distorted regions which may occur at the ends of the glass block to be produced. Once cut and ground, the wafers were cleaned in an ultrasonic cleaner with alcohol as a cleaning solvent and thereafter stacked into a 55 mm diameter platinum mold with the wafers of higher density glass below those of lower density glass.

This stack was then placed in a high temperature box furnace and treated by:

(i) Raising the furnace temperature from room temperature to 1100° C. at a rate of 20° C./min and maintaining that temperature for a period of 2 hours;

(ii) Lowering the furnace temperature to 1000° C. at a rate of 10° C./min rate and maintaining that temperature for a period of 98 hours;

(iii) Then lowering the furnace temperature to 300° C. at a rate of 1° C./min; and (iv) Thereafter shutting down the furnace power and allowing the stack to cool with the furnace.

Samples of gradient index glass were then removed from the mold using core-drilling, and prepared for evaluation by means of a refractive index profile measurement and a wavefront quality test. The results of these tests are plotted on the graph in FIG. 2 and show that lenses produced by this method exhibit a nearly linear profile of refractive indices with only a 0.25 RMS wavefront distortion.

EXAMPLE 2

Using the same seven glasses as in Example 1, chunks of each glass type approximately 10×10×20 mm$^3$ in size were cut using a diamond saw. These chunks were ultrasonically cleaned, and then the specific weight (with a tolerance of ±0.02 g) of chunks of each type of glass required to produce a lens of the same GRIN profile as that produced in Example 1 were weighed out. The diffusion was carried out in a 55 mm diameter circular cylindrical platinum mold. The weight of each glass layer was calculated from the mold size, density and desired thickness for each glass layer. The desired layer thickness are the same as those in Example 1. The weights of the 7 different layers are:

| Glass 1 | 35.87 g |
|---|---|
| Glass 2 | 12.86 g |
| Glass 3 | 14.35 g |
| Glass 4 | 15.68 g |
| Glass 5 | 21.40 g |
| Glass 6 | 11.33 g |
| Glass 7 | 60.82 g |

Figure 2:
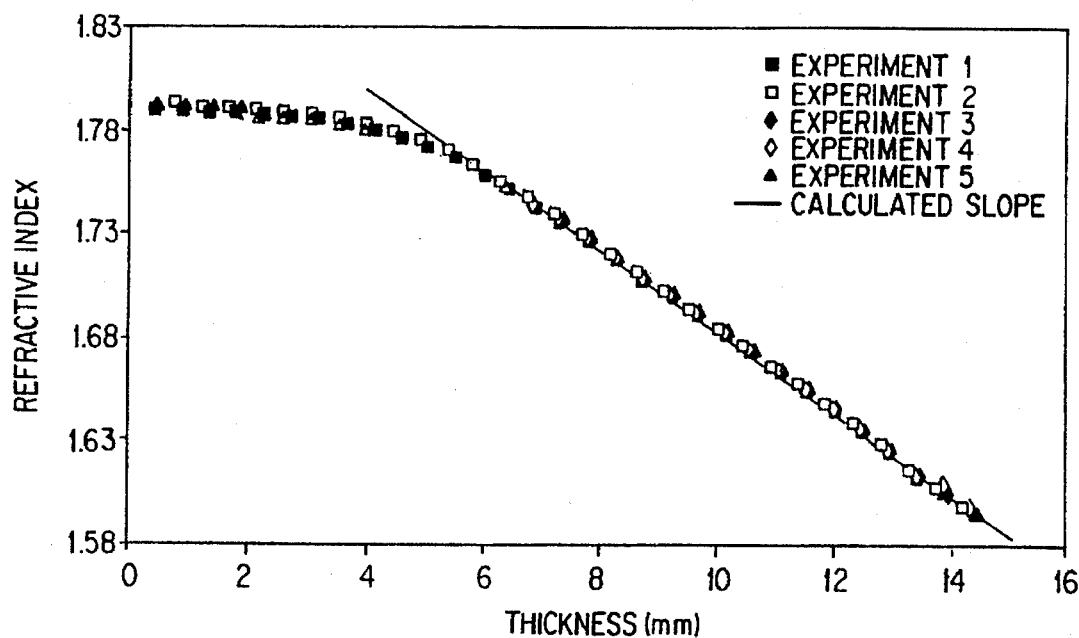
FIG. 2 is a graph of refractive index versus lens thickness illustrating the results of five experiments conducted.

These glass chunks were then layered into the 55 mm diameter platinum mold with the layers of the more dense glass below those of the less dense glass, and treated to the same heating conditions as in Example 1. As a result of this heating, the different chunks of glass melted and fused together to form a solid, contiguous unit which was then tested using the same profile testing methods as before. The results of these tests, also plotted on the graph in FIG. 2, showed that this method produced a GRIN lens material having a better linear profile of refractive indices with the same slope as before and exhibiting the same 0.25 RMS wavefront distortion.

A reason for the better profile in this Example is that the wafers used in the process described in Example 1 had a deviation in thickness of about 0.05 mm. Considering that the average wafer thickness is about 1.5 mm, this means that the wafer thickness deviated by about 3.3%. For the process used in this Example 2, however, the deviation in weight is about 0.02 g. Considering the average weight of each chunk is about 15 g, this translates into a deviation in weight of only about 0.13%. This means that the thickness of the molten glass layers during diffusion also varies by about ±0.13%. In other words, because the control of the weight of the chunks is much more precise and accurate than that of the wafer thickness, the resulting layer thicknesses in the final GRIN lens are much more precisely defined using this process of this invention.

EXAMPLE 3

Using the same seven lead silicate glasses as in Example 2, pieces of the different glasses were heated to 450° C. and then quenched in cold water to form a frit with a particle size ranging from 0.5 to 20 mm. The different frits were then weighed to the same specified weights as in Example 2. These frits were then layered in the same platinum mold with the layers placed in order of decreasing density such that the layer of frit of the most dense glass is at the bottom of the mold and the layer of frit of the least dense glass is at the top. The layers of frit were then subjected to the same heating and subsequent testing processes as before.

The results, which are also plotted on the graph of FIG. 2, show that using the frit of this type produced a GRIN lens material having a linear profile of refractive indices with the same slope as in Example 2 and exhibiting the same 0.25 RMS wavefront distortion.

EXAMPLE 4

In this Example the seven lead silicate glass frits made in Example 3 were crushed into particles of 0.1 to 10 mm in size. These finer frits were then used to produce a block of GRIN lens material in the same way as described above with reference to Example 3. This material was also tested in the same way as before.

The results, which are once again plotted on the graph of FIG. 2, show that using this smaller frit also produced a GRIN lens material having a the same linear profile of refractive indices as in Example 2 and exhibiting the same 0.25 RMS wavefront distortion.

EXAMPLE 5

In this Example, samples of the same seven lead silicate glasses used before were remelted at 1100° C. for 1 hr and then poured directly into cold water. The resulting thermal shock caused the glass to form a fine frit with a particle size ranging from 0.1 to 10 mm. These frits were used to produce samples of GRIN material as before.

The results of subsequent testing, which are also plotted on the graph of FIG. 2 for comparison, show that using this very small frit also produced a GRIN lens material having a the same linear profile of refractive indices as before with the same 0.25 RMS wavefront distortion.

EXAMPLE 6

In Example 6, an alternative group of six different lead silicate glasses were chosen. As can be seen from their properties listed below, their refractive indices ranged from 1.734 to 1.964:

| GLASS TYPE | INDEX | DENSITY (g/cm$^3$) | THERMAL EXPANSION COEFFICIENT (10$^{-7}$ 1/C.) |
| --- | --- | --- | --- |
| a | 1.734 | 4.548 | 97 |
| b | 1.779 | 4.902 | 96 |
| c | 1.825 | 5.256 | 98 |
| d | 1.858 | 5.663 | 97 |
| e | 1.917 | 5.979 | 99 |
| f | 1.964 | 6.279 | 98 |

Using the same methods as before, the thickness of the different glass layers necessary for the desired GRIN profile were determined. As with the design in Example 1, the top and bottom layers were deliberately made thicker than required. This was to compensate for the removal of inhomogeneous or distorted ends which may be result from the manufacturing of the GRIN material. Once this was done, glass frits were made, in the same way as in Example 3, having a particle size ranging from 0.5 to 10 mm. These frits were then weighed and arranged in a platinum mold in the same way as before.

The diffusion was carried out in a 55 mm diameter circular cylindrical platinum mold. The weight of each glass layer was calculated from the mold size, density and required thickness for each glass layer. The weights of the 7 different layers are:

|  | Thickness (mm) | Weight (g) |
| --- | --- | --- |
| Glass a | 5.00 | 54.03 |
| Glass b | 2.30 | 26.79 |
| Glass c | 2.50 | 31.22 |
| Glass d | 2.60 | 34.98 |
| Glass e | 1.07 | 15.20 |
| Glass f | 5.00 | 74.59 |

Once again, the frits in the mold were subjected to heating in a high temperature box furnace. The heating procedure followed the following steps:

(i) Heating from room temperature to 1000° C. at a rate of 20° C./min and maintaining that temperature for a period of 2 hours;

(ii) Cooling to a temperature of 900° C. at a rate of 10° C./min rate and maintaining that temperature for a period of 40 hours;

(iii) Further cooling to a temperature of 250° C. at a rate of 2° C./min; and (iv) Shutting down the furnace power and allowing the stack to cool with the furnace.

Figure 3:
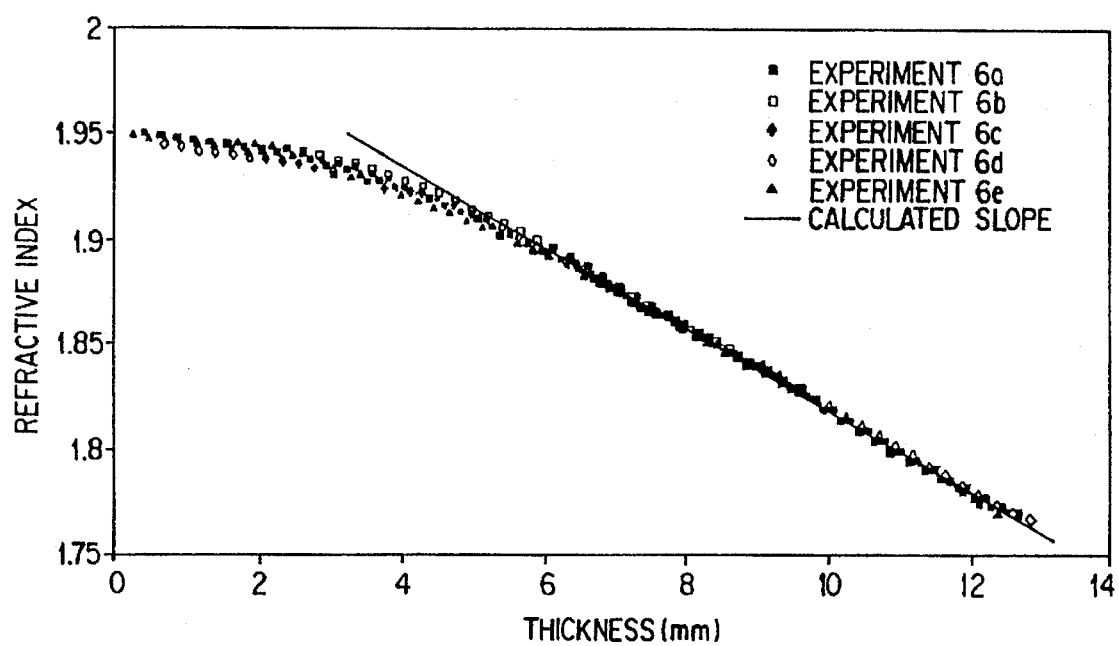
FIG. 3 is a graph of refractive index versus lens thickness illustrating the results of a further five experiments conducted.

Samples of gradient index glass were then removed from the mold using core-drilling and prepared for evaluation by means of a refractive index profile measurement and a wavefront quality test as before. The results of these tests are plotted on the graph in FIG. 3 and show that the GRIN optical material produced exhibits a nearly linear profile of refractive indices with only a 0.25 RMS wavefront distortion.

The results of Examples 2 to 6 show that the process of this invention can be used to make high quality optical axis GRIN glass with good repeatability. It is believed that the reason for the success of this process is because of the difference in densities among the lead-silicate glasses used. It is estimated that when the density difference between two neighboring glasses is larger than 0.1 g/cm$^3$, the process of this invention will be suitable.

Also, it should be noted that the Examples show that this process does not have a strict requirement as to the size of frit used. Frits with particle size ranges from 0.1 mm to 30 mm were used and all yielded approximately the same results. Nonetheless, a frit with particles ranging from 0.1 to 5 mm is preferable as these particles are easier to handle and weigh. It has been found that by directly pouring molten glass into cold water (as described in Example 5) or some other wet or dry cold bath, will result in a frit with most particles being in this size range. Most preferably, the frit particles are in the range of about 0.5 to 4 mm.

Figure 4:
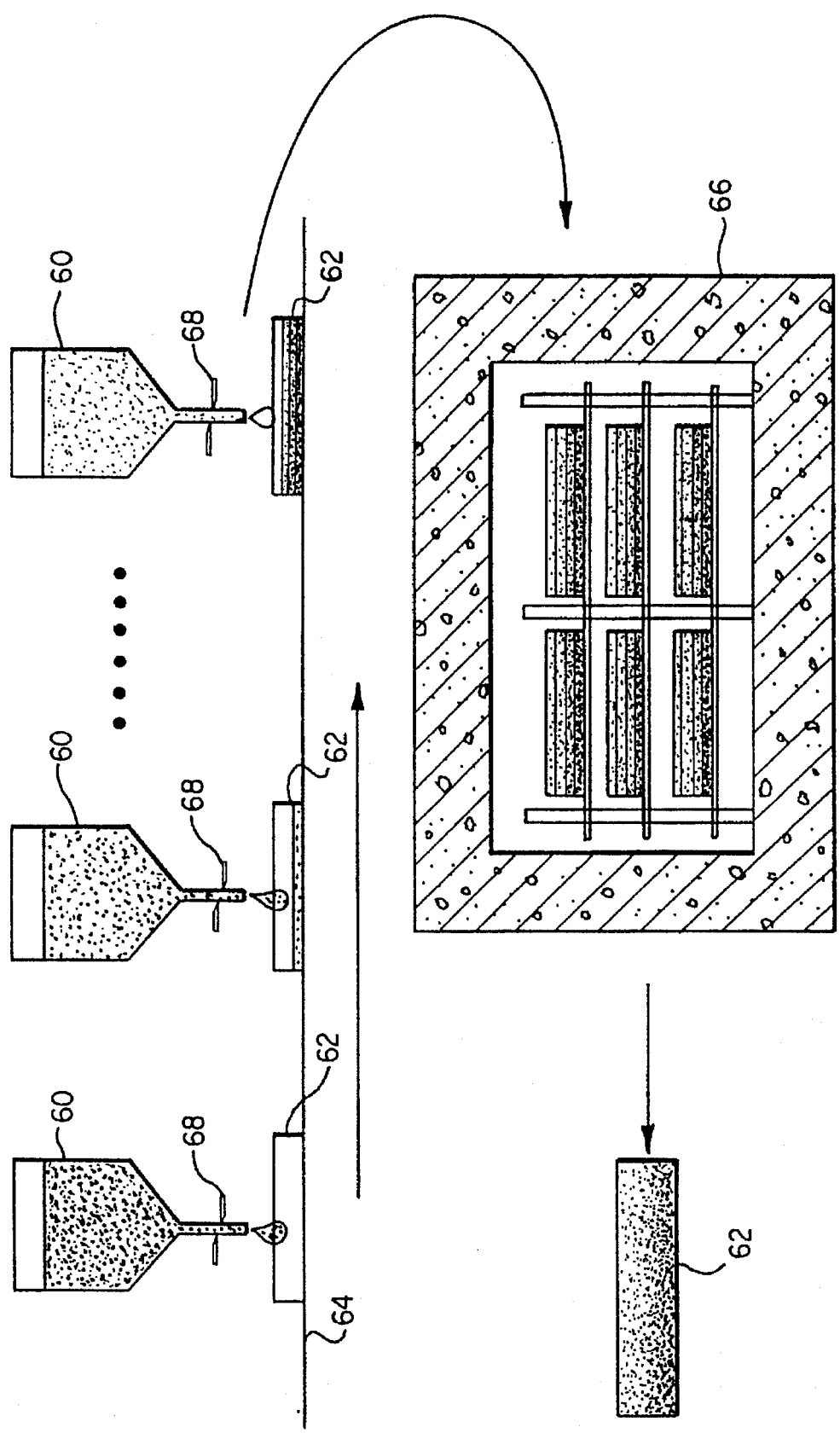
FIG. 4 illustrates a further embodiment of the method of the invention.

An alternative embodiment of this invention is illustrated in FIG. 4. In this embodiment, the required profile and thicknesses of the different layers of glass are known as before. From the layer thickness and mold plan dimension, the volume and/or weight of glass in each layer can be determined as before.

A plurality of glass melters 60 are set up so that each can dispense a predetermined volume (or weight) of a specific glass into a mold 62. The melters 60 are set up so that the most dense glass is dispensed first followed by the less dense glasses in order of decreasing density. This process can be automated with molds 62 carried by a conveyor 64. Many molds 42 can be filled and processed together in a suitable furnace 66.

Control of the dispensing of the molten glass can be achieved by a computer activated cutter, schematically shown as 68, so that the correct amounts of glass, in the correct order are dispensed to the mold 62. The process of this embodiment is particularly suited to making large diameter optical-axis GRIN lenses and to automation.

One of the significant advantages of this invention is that the process of this invention gives much better control over the thicknesses of the different glass layers that make up the GRIN material. This is particularly so where the required lenses have larger diameters (greater than say, 100 mm in diameter).

For example, it is very difficult and costly to make a glass wafer which is 200 mm in diameter and only 1.5 mm thick with its front and back faces exactly parallel to each other. Even a 0.1 mm change in thickness can cause as much as a 7% change in the slope of the gradient of the profile of refractive indices. Using the method of the invention, however, the weight of the wafer, typically 200 to 300 grams, can be controlled to as accurately as ±0.05 grams; a deviation which will cause only a 0.03% variation in slope.

Another advantage, which flows directly from the above advantage, is that this quality control is achieved using a process which is much less expensive that the prior art "wafer" process.

Yet another advantage of the invention is that the original pieces if glass used to make up the chunks, frits or glass melts, do not have to be of the same high optical quality as in the "wafer" process of the prior art. This is because at least some stria and bubbles will be eliminated from the molten glass as it is kept under the prolonged high temperatures during diffusion.

Still another advantage is that, as the glass in each layer melts, it assumes a flat and level upper surface that interfaces with the lower surface of the layer directly above it. In addition, if the mold is level, each layer will have a uniform thickness which is produced automatically without any expensive grinding or cutting.

Although the present invention has been described above in terms of specific embodiments relating to optical material with a linear profile in refractive indices, it is anticipated that its principals can be applied in to other forms of profiles of refractive indices. Other alterations and modifications of the process of the invention will no doubt become apparent to those skills in the art. It is therefore intended that the following claims be interpreted as covering all such other applications, alterations and modifications as fall within the true spirit and scope of this invention.

What is claimed is:

1. A method of manufacturing a body of optical material having a gradient of refractive index across its thickness, comprising the steps of:

(a) successively dispensing in order of decreasing density measured amounts of a plurality of different individual optical materials into a mold in the form of a frit to form a series of layers of such individual optical materials in which the density of the individual optical materials of the layers of decreases from the bottom toward the top of the mold, the frit forming each of said layers having a substantially uniform composition, the frit comprising particles in the size range of 0.1 to 30 mm in diameter; and (b) heating the optical materials in the mold to at least the melting point of the highest melting point optical material in the mold to cause the dispensed materials to fuse together into a contiguous body of optical material having a gradient in its refractive index across its thickness.

2. The method of claim 1, wherein the particles of said frit of each of said layers have a size of 0.1 to 6 mm in diameter.

3. The method of claim 1, wherein said frits are produced by heating and, thereafter rapidly cooling a piece of the optical material from which the frit is formed.

4. The method of claim 1, wherein the frit is produced by melting said material and then bringing the melted material into contact with a substantially colder substance.

5. The method of claim 1, wherein said frit is produced by crushing the optical material.

6. A method of manufacturing a body of optical material having a gradient of refractive index across its thickness, comprising the steps of:

(a) dispensing into a mold of known cross-sectional area layers of measured amounts of different optical materials, each in the form of a frit comprising particles in the size range of 0.1 to 30 mm in diameter, said measured amounts being determined by the weight of such optical material required to yield a desired volume of such optical material, the frit in each of said layers having a substantially uniform composition, each of said optical materials having a density different from the others of said optical materials; and (b) heating the optical materials in the mold to at least the melting point of the highest melting point optical material to cause the dispensed materials to fuse together into a contiguous body having a thickness, said layers arranged in the mold in order of decreasing density from the bottom to the top of said mold.

* * * * *